US012601392B1

(12) United States Patent
Lin et al.

(10) Patent No.: US 12,601,392 B1
(45) Date of Patent: Apr. 14, 2026

(54) ROLLER SCREW BIDIRECTIONAL AXIAL PRELOADING STRUCTURE

(71) Applicant: FOSITEK CORPORATION, New Taipei City (TW)

(72) Inventors: Chun-Han Lin, New Taipei City (TW); Yung-Chih Tseng, New Taipei City (TW); Zoen Ryon Ryan Wong, New Taipei City (TW); Po-Yun Chen, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/261,483

(22) Filed: Jul. 7, 2025

(30) Foreign Application Priority Data

Jun. 4, 2025 (TW) ................................ 114120946

(51) Int. Cl.
F16H 25/22 (2006.01)

(52) U.S. Cl.
CPC . F16H 25/2252 (2013.01); *F16H 2025/2257* (2013.01); *F16H 2025/2276* (2013.01)

(58) Field of Classification Search
CPC ......... F16H 25/2252; F16H 2025/2257; F16H 2025/2276
See application file for complete search history.

(56) References Cited

FOREIGN PATENT DOCUMENTS

| CN | 113251122 A | 8/2021 |
| CN | 119664863 A | 3/2025 |
| TW | M674056 U | 8/2025 |

OTHER PUBLICATIONS

Search Report dated Oct. 30, 2025 issued by Taiwan Intellectual Property Office for counterpart application No. 114120946.

*Primary Examiner* — William C Joyce
(74) *Attorney, Agent, or Firm* — Demian K. Jackson; Jackson IPG PLLC

(57) ABSTRACT

A roller screw bidirectional axial preloading structure includes a screw, a nut, and a plurality of first and second rollers arranged around the screw in an interleaved manner and respectively having two ends connected to a first and a second retainer. A first gap is formed between the first retainer and one end of each first roller, and a second gap is formed between the second retainer and the other end of each second roller, such that the first and the second gaps are axially spaced while circumferentially interleaved around the screw. Two elastic elements are located outside the first and second retainers to apply two forces, which are transmitted via the first and second retainers to the first and the second rollers to create two directionally opposite axial preloads on the first and second rollers, giving the roller screw good mechanical power transmission accuracy and stability in motion.

5 Claims, 10 Drawing Sheets

ROLLER SCREW BIDIRECTIONAL AXIAL PRELOADING STRUCTURE

This application claims the priority benefit of Taiwan patent application number 114120946 filed on Jun. 4, 2025, the disclosure of which is hereby incorporated by reference in its entirety.

FIELD OF THE INVENTION

The present invention relates to a transmission assembly, and more particularly, to a roller screw bidirectional axial preloading structure that can create axial preloads on a group of rollers to achieve enhanced rolling stability of the rollers.

BACKGROUND OF THE INVENTION

The planetary roller screw transmission assembly, also briefly referred to as the planetary roller screw, has high load carrying capability, high rigidity, excellent transmission efficiency, and high locating accuracy, and is accordingly, widely applied to the fields involving precision machine tools, servo drive systems, aerospace control devices, and high-performance robots that require quick response and high dynamic performance. A fundamental structure of the planetary roller screw transmission device includes a plurality of rollers arranged around a screw and located between the screw and a nut, such that the rollers are in rolling engagement with the screw and the nut simultaneously. With these arrangements, a rotational motion can be converted to a linear motion for driving an external load.

As shown in FIG. 1A, a common planetary roller screw transmission device includes a screw 11, a nut 12, a plurality of rollers 13, and a plurality of retainer units 14. The screw 11 has a thread structure provided on an outer surface thereof. The nut 12 defines an inner bore 120 for receiving the rollers 13 therein. The inner bore 120 of the nut 12 has annular teeth 12$t$ formed on around an inner wall surface thereof for meshing and forming a rolling contact with annular teeth formed on around the outer surfaces of the rollers 13. The retainer units 14 are provided at two axially outer ends of the rollers 13 to hold the rollers 13 between the screw 11 and the nut 12 as well as maintain the rollers 13 at circumferentially spaced positions.

However, the above described conventional planetary roller screw transmission device has many disadvantages in practical operation thereof. As shown in FIGS. 1B and 1C, a highly precise geometrical match should exist between the rollers 13 and the screw 11 and the nut 12. Any tolerance in manufacturing or error in assembling would form a minor gap G between the rollers 13 and the screw 11 and the nut 12, such that the positions on the rollers 13 that actually contact the screw 11 and the nut 12 are offset from the designed pitch circle radius. In the event the fitting gap G is not effectively compensated, there would not be sufficient frictional force between the rollers 13 and the nut 12 when the planetary roller screw transmission device operates. As a result, the rollers 13 will skid or idle relative to the nut 12 and can rarely keep a pure rolling contact and sliding friction with the nut 12. The skidding or idling rollers 13 are subjected to a relatively high wear and reduced structural life. Similarly, there might be insufficient contact between the rollers 13 and the screw 11 to cause skidding of the rollers 13 relative to the screw 11, which would adversely prevent the planetary motion from slowing down or advancing properly and accordingly, reduced linear push efficiency and locating accuracy.

Although the retainer units 14 are used in the conventional planetary roller screw transmission device to control the radial spacing of the rollers 13, the retainer units 14 provide only a mechanically locating function without the ability to provide preload compensation or guide the rollers to different directions of motion. The retainer units 14 could not effectively overcome the problems of skidding and off setting rollers 13 caused by the gap G between the rollers 13 and the screw 11 and the nut 12.

Therefore, it is important to effectively increase the stable contact between the rollers 13 and the nut 12 and enhance the rolling engagement of the rollers 13 with the screw 11 to ensure the stability of the rolling motion among the screw 11, the rollers 13 and the nut 12 without increasing the structural complexity and manufacturing cost of the planetary roller screw transmission device.

SUMMARY OF THE INVENTION

A primary object of the present invention is to provide a roller screw bidirectional axial preloading structure, which can effectively compensate the fitting gap formed by machining tolerance to solve the above technical problems. The structure of the present invention includes two groups of rollers that are arranged around a screw in a circumferentially interleaved manner. Two directionally opposite axial forces are applied by two elastic elements to create two bidirectional axial preloads on the two groups of rollers, so as to achieve stable bidirectional rolling contact effect, increased overall transmission efficiency, reduced frictional loss, and extended service life.

To achieve the above and other objects, the roller screw bidirectional axial preloading structure according to the present invention includes a screw, a nut, a roller unit, a retainer unit, and two elastic elements. The screw has a thread structure formed on an outer surface thereof. The nut is fitted around the screw and has at least one annular grooved zone provided on an inner wall surface thereof. The roller unit is located between the screw and the nut and includes a plurality of first rollers and a plurality of second rollers. The first and the second rollers are arranged around the screw in a circumferentially interleaved manner. The first and the second rollers are provided on around respective outer circumferential surfaces with a plurality of annular teeth for meshing with the thread structure on the screw and the at least one annular grooved zone in the nut. The retainer unit is provided in the nut and includes a first retainer and a second retainer, which are located at two ends of the roller unit. The first rollers and the second rollers respectively have a first and a third outermost end section connected to the first retainer, and the first rollers and the second rollers respectively have a second and a fourth outermost end section connected to the second retainer. A first gap is formed between the first retainer and each first outermost end section of the first rollers and, and a second gap is formed between the second retainer and each fourth outermost end section of the second rollers. The first gap and the second gap are located at two opposite ends of the roller unit and are arranged around the screw in a circumferentially interleaved manner. The two elastic elements are fitted in the nut to be separately located at two axially outer sides of the first and the second retainer to respectively apply an axially force on the first and the second rollers. A washer and a retaining member can be provided at an axially outer side of each of the two elastic elements to set the paths along which forces are applied, guided, and transmitted to the first and second rollers. With the first and second gaps that are arranged around the screw in the circumferentially interleaved manner and the two elastic elements that apply forces from two axially opposite directions to the first and second rollers, two directionally opposite axial preloads are created on the first and the second rollers, so that the first and second rollers during operation can always in stable and fully rolling contact with the screw and the nut.

In a specific embodiment, each first gap is formed by giving the first and the second outermost end section with different axial lengths, and each second gap is formed by giving the third and the fourth outermost ends section with different axial lengths. Alternatively, the first gap and the second gap can be formed by forming locating slots of different slot depths on both the first and second retainer for correspondingly receiving the outermost end sections of the first and the second rollers having the same axial length. The first and the second gaps formed in any one the above ways and arranged around the screw in a circumferentially interleaved manner can provide an interleaved preloading effect.

In conclusion, in the roller screw bidirectional axial preloading structure according to the present invention, two directionally opposite axial forces are applied by two elastic elements and guided by circumferentially interleaved gaps around the screw to be transmitted to the first and the second rollers. In this manner, it is able to achieve a structural design capable of compensating and preloading two groups of rollers in a planetary roller screw transmission device. This structural design not only effectively solves the problems of skidding and idling rollers caused by machining tolerance to thereby enable increased structural stability in motion, but also increases the overall rolling efficiency and locating accuracy of the roller screw to thereby enable highly accurate force transmission and valuable benefits in practical application.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
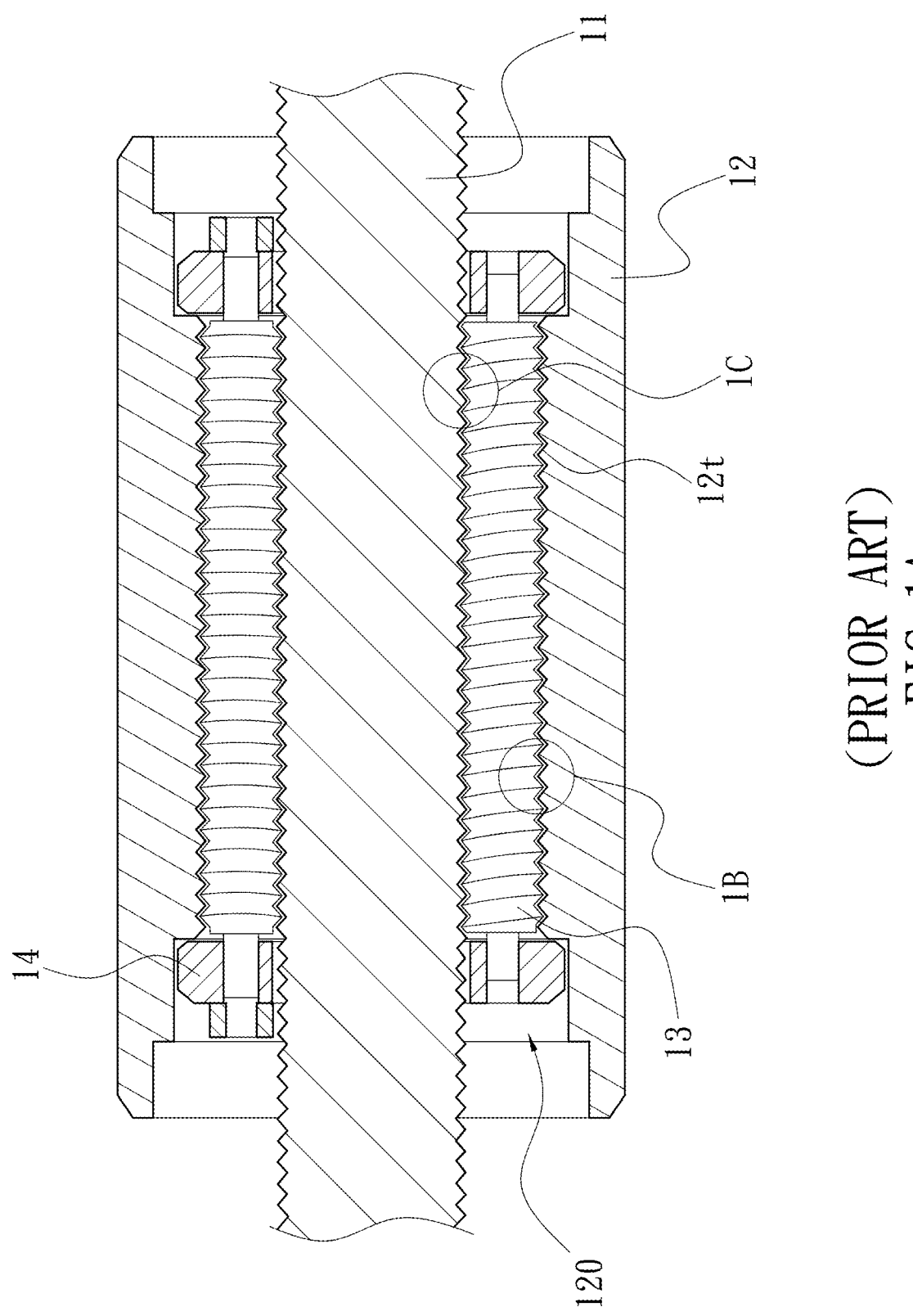
FIG. 1A is a sectional side view showing the structure of a conventional planetary roller screw transmission device, which includes a plurality of rollers, a nut, and a screw.
Figure 1C:
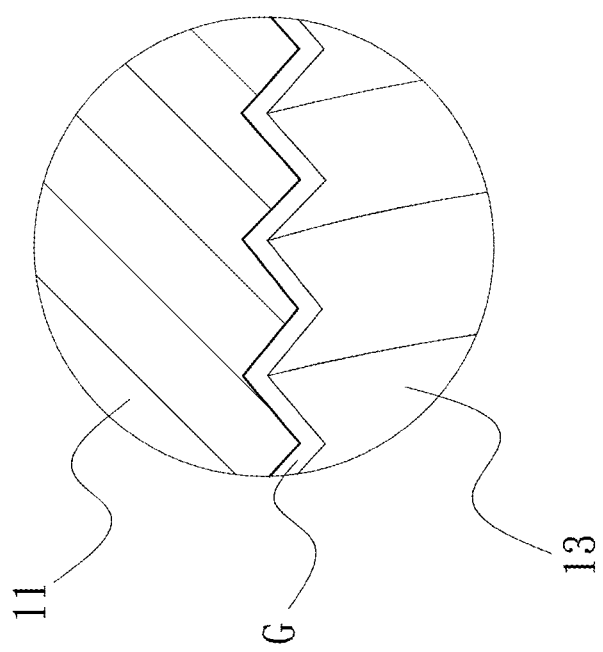
FIG. 1C shows the roller and the screw in the planetary roller screw transmission device of FIG. 1A mesh with each other.
Figure 1B:
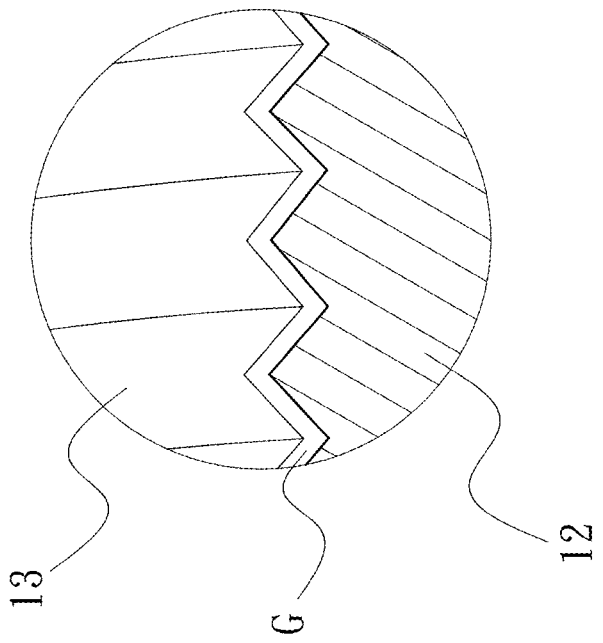
FIG. 1B shows the roller and the nut in the planetary roller screw transmission device of FIG. 1A mesh with each other.

The present invention will now be described with some preferred embodiments thereof and by referring to the accompanying drawings. For the purpose of easy to understand, elements that are the same in the preferred embodiments are denoted by the same reference numerals.

Please refer to FIGS. 2, 3A to 3C, and 4 to 5. A roller screw bidirectional axial preloading structure according to a preferred embodiment of the present invention includes a screw 21, a nut 22, a roller unit R, a retainer unit K, and two elastic elements 271, 272.

The nut 22 can be a hollow cylindrical member internally defining an inner bore 220 axially extended between two open ends. The inner bore 220 of the nut 22 is provided on an inner wall surface with two annular grooved sections 221. The roller unit R is in rolling engagement with the annular grooved sections 221. The annular grooved sections 221 provide circular guide and contact limit, so that the roller unit R can roll stably in a planetary motion in the nut 22 without moving axially out of the nut 22. Each of the annular grooved sections 221 has a plurality of circumferentially extended annular grooves 221g. Two annular recesses 222 are separately formed in the inner bore 220 in two non-grooved zones near two ends of the inner bore 220.

Further, the nut 22 includes a radially recessed avoiding zone 223 formed on the inner wall surface of the inner bore 220 between the two annular grooved sections 221. The avoiding zone 223 has an inner diameter larger than that at other portions of the inner bore 220 to provide sufficient space to avoid interference of the roller unit R with the inner wall surface of the nut 22. The specific function of the avoiding zone 223 will be described later.

The screw 21 is an elongated rod-like member, such as an elongated round shaft, which is coaxially located in the nut 22 and is axially extended through the inner bore 220 to an outer side of the nut 22 to be easily connected to a driving device or installed on an external mechanism. The screw 21 has a thread structure 211 (i.e. a spiral groove or a spiral tooth) provided on an outer surface thereof. The thread structure 211 may be a multi-start thread structure. In practical application of the present invention, the screw 21 may be driven by an external power source (not shown) to rotate. The screw 21 and the roller unit R mesh with each other via the thread structure 211, such that the roller unit R spins between the screw 21 and the nut 22 while it revolves around the screw 21. In other words, the roller unit R rolls around the screw in a planetary motion. With this dynamic mechanism, a rotational motion of the screw 21 is converted to an axial linear motion of the nut 22 in a reverse direction to thereby achieve a linear push effect in high efficiency and high accuracy.

Please refer to FIGS. 2, 3A to 3C, and 4. The roller unit R is fitted in the inner bore 220 of the nut 22 and is located between the nut 22 and the screw 21. The roller unit R includes a plurality of circumferentially interleaved first rollers 23 and second rollers 24. The first and the second rollers 23, 24 are located around and radially equally spaced along the outer surface of the screw 21. In the illustrated preferred embodiment, there are shown three pieces of first rollers 23 and three pieces of second rollers 24, which are correspondingly provided around the screw 21 at different angular positions and in rolling engagement with the corresponding thread structure 211.

Figure 3B:
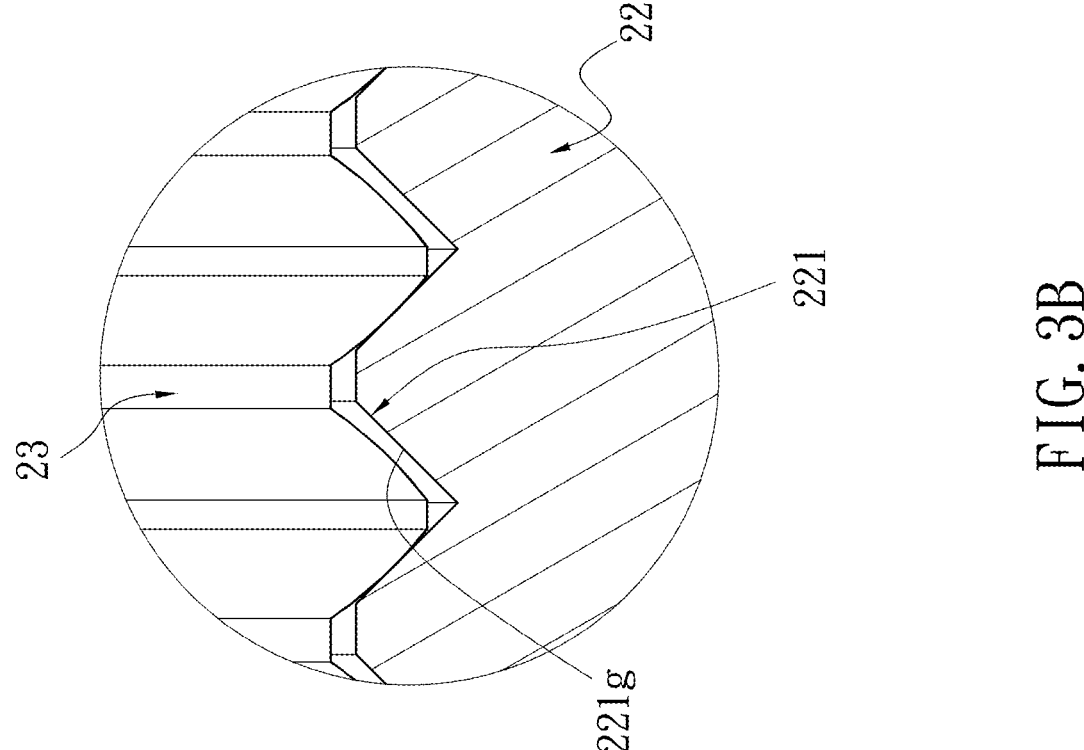
FIG. 3B is an enlarged view of the circled area of FIG. 3A.
Figure 3C:
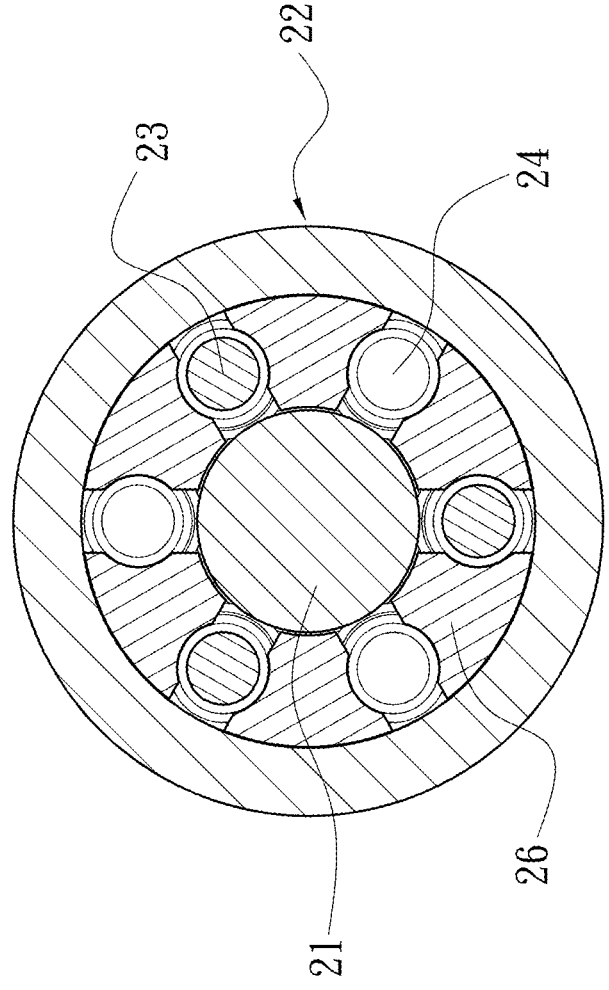
FIG. 3C is a sectional view of FIG. 3A, when viewing from a right end thereof.
Figure 4:
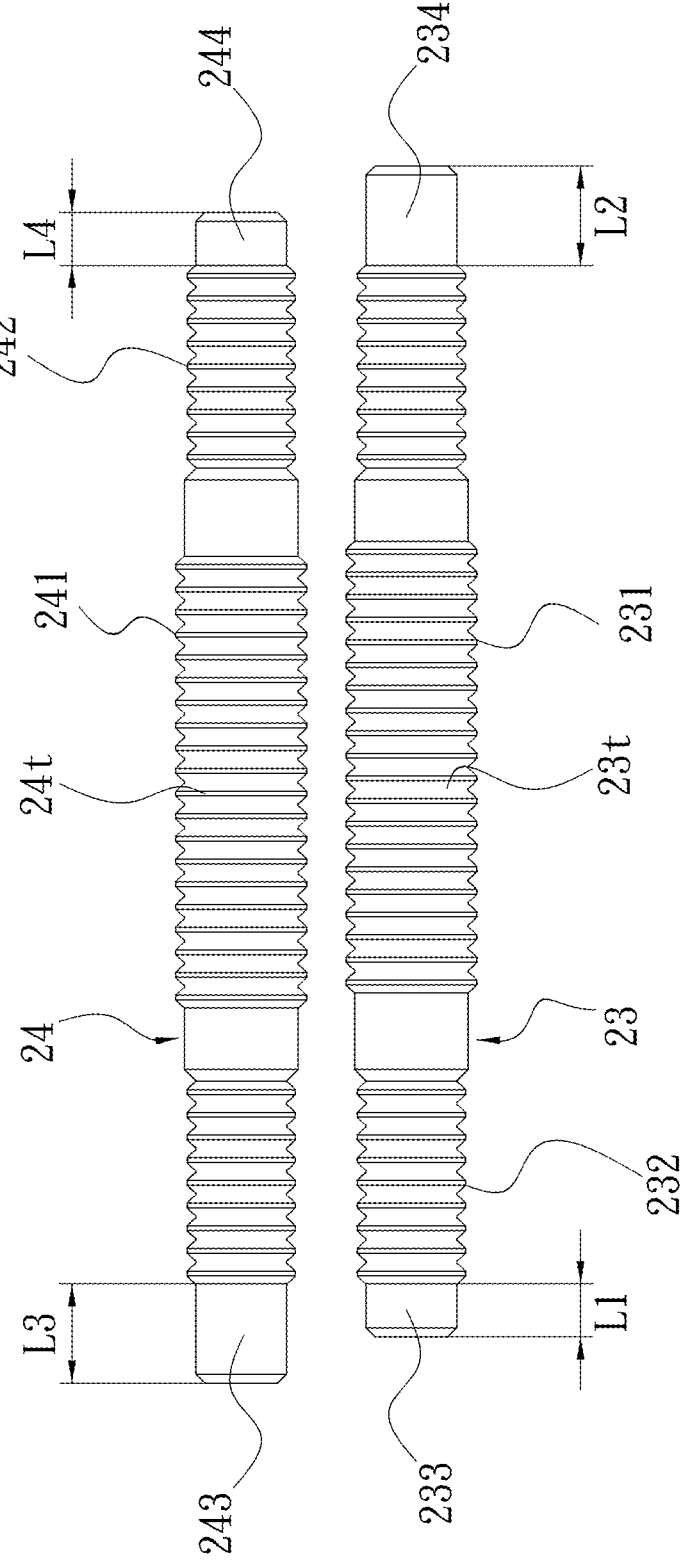
FIG. 4 shows a first roller and a second roller in the preferred embodiment of the present invention respectively have two outermost end sections with different axial lengths.

The first rollers 23 and the second rollers 24 are axially extended cylindrical posts with a plurality of annular teeth 23t, 24t formed around respective outer circumferential surface, as shown in FIG. 4, for meshing with structures correspondingly formed on the screw 21 and the nut 22. Specifically, each first roller 23 and each second roller 24 are axially divided into at least one meshing section 231, 241 and at least one second meshing section 232, 242. The first meshing sections 231, 241 have a diameter larger than that of the second meshing sections 232, 242. The annular teeth 23t, 24t in the first meshing sections 231, 241 are used in rolling engagement with the thread structure 211 of the screw 21, and the annular teeth 23t, 24t in the second meshing sections 232, 242 are used in rolling engagement with the annular grooves 221g in the annular grooved sections 221 of the nut 22, as shown in FIG. 3B.

Figure 3A:
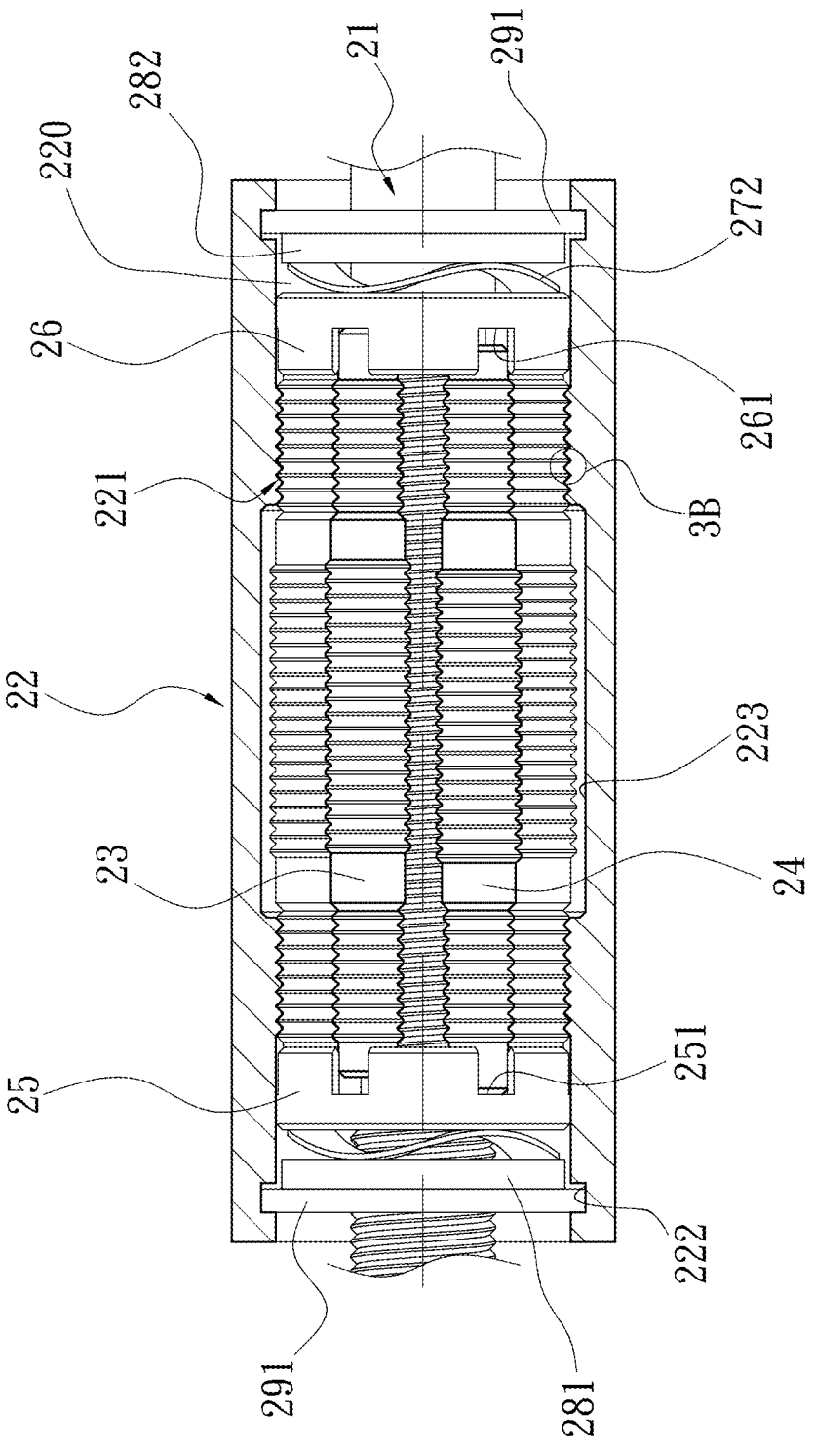
FIG. 3A is an assembled sectional side view of FIG. 2.

As shown in FIGS. 3A and 4, the first meshing sections 231, 241 are located at a middle portion of the first rollers 23 and the second rollers 24, respectively. The second meshing section 232 is formed at each of two end portions of the first roller 23 axially outside two ends of the first meshing section 231. Similarly, the second meshing section 242 is formed at each of two end portions of the second roller 24 axially outside two ends of the first meshing section 241. With these arrangements, the first rollers 23 and the second rollers 24 respectively have two diametrically opposite sides in rolling engagement with the screw 21 and the nut 22 at the same time. However, to avoid interference of the first meshing sections 231, 241 with the inner wall surface of the nut 22, the avoiding zone 223 is formed on the inner wall surface of the nut 22 at a location corresponding to the first meshing sections 231, 241. The avoiding zone 223 provides sufficient radial space, such that the first meshing sections 231, 241 of the first and the second rollers 23, 24, respectively, are in contact and rolling engagement with the screw 21 only.

A first and a second outermost end section 233, 234 of each first roll 23 and a third and a fourth outermost end section 243, 244 of each second roller 24 are not provided with any annular tooth 23t, 24t. These outermost end sections 233, 234, 243, 244 are used to connect with the retainer unit K. The first outermost end section 233 of each first roller 23 has an axial length L1 smaller than an axial length L2 of the second outermost end section 234 of the first roller 23. The fourth outermost end section 244 of each second roller 24 has an axial length L4 smaller than an axial length L3 of the third outermost end section 243 of the second roller 24. The design purpose of these different axial lengths L1, L2 and L3, L4 will be explained in the following detailed description of the retainer unit K and the preloading structure of the present invention.

Figure 2:
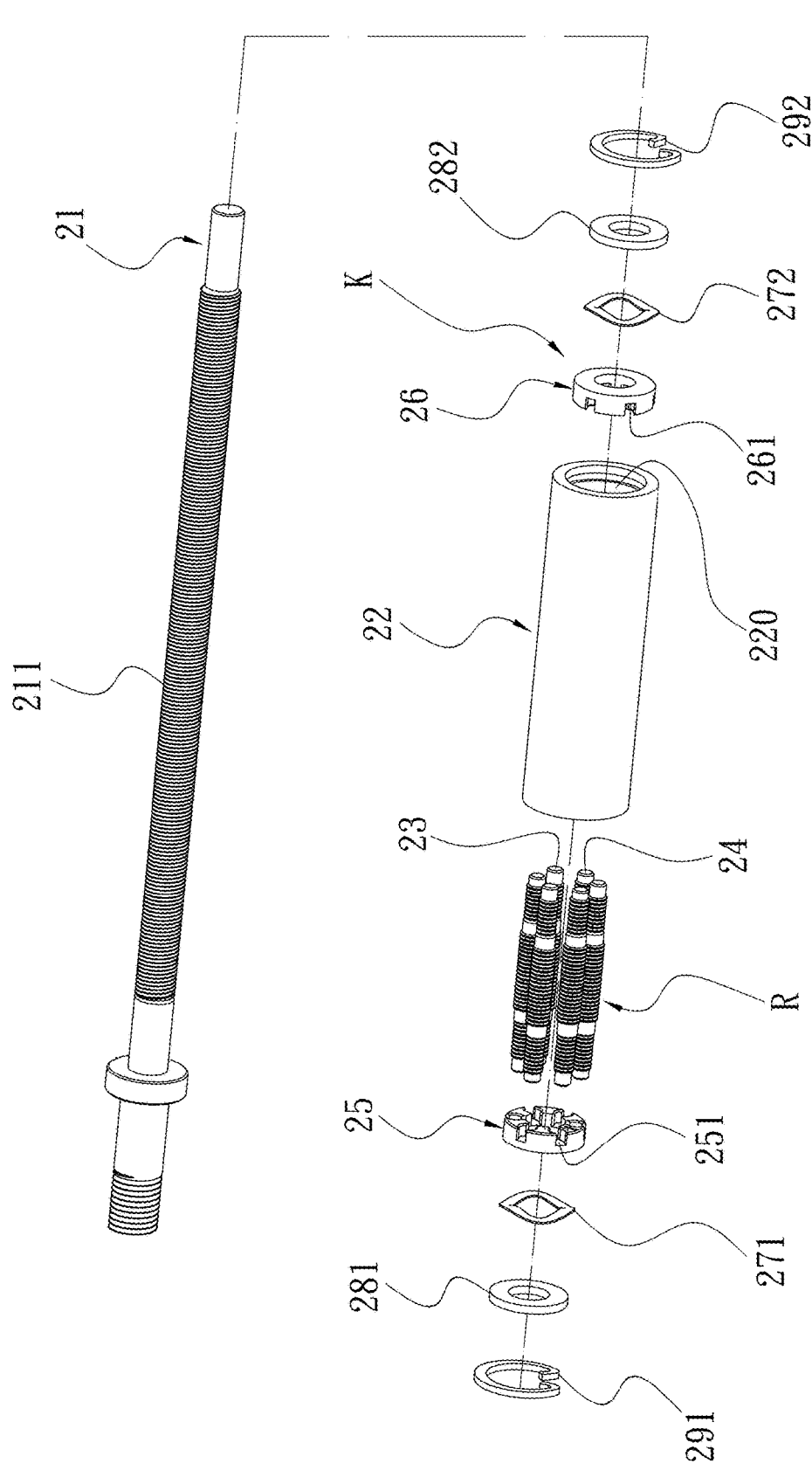
FIG. 2 is an exploded perspective view of a roller screw bidirectional axial preloading structure according to a preferred embodiment of the present invention.

Please refer to FIGS. 2, 3A, and 4. The retainer unit K includes a first retainer 25 and a second retainer 26, which are separately provided at two ends of the roller unit R and are fixedly held in the nut 22. The first and the second retainer 25, 26 are respectively provided with locating slots corresponding to the roller unit R for fixedly holding the first rollers 23 and the second rollers 24 to the circumferentially spaced angular positions around the screw 21. Specifically, the first retainer 25 includes a plurality of first locating slots 251 for receiving the first and the third outermost end sections 233, 243 of the first and the second rollers 23, 24, respectively. All the first locating slots 251 have the same slot depth. The second retainer 26 includes a plurality of second locating slots 261 for receiving the second and the fourth outermost end sections 234, 244 of the first and the second rollers 23, 24, respectively. All the second locating slots 261 have the same slot depth.

Figure 5:
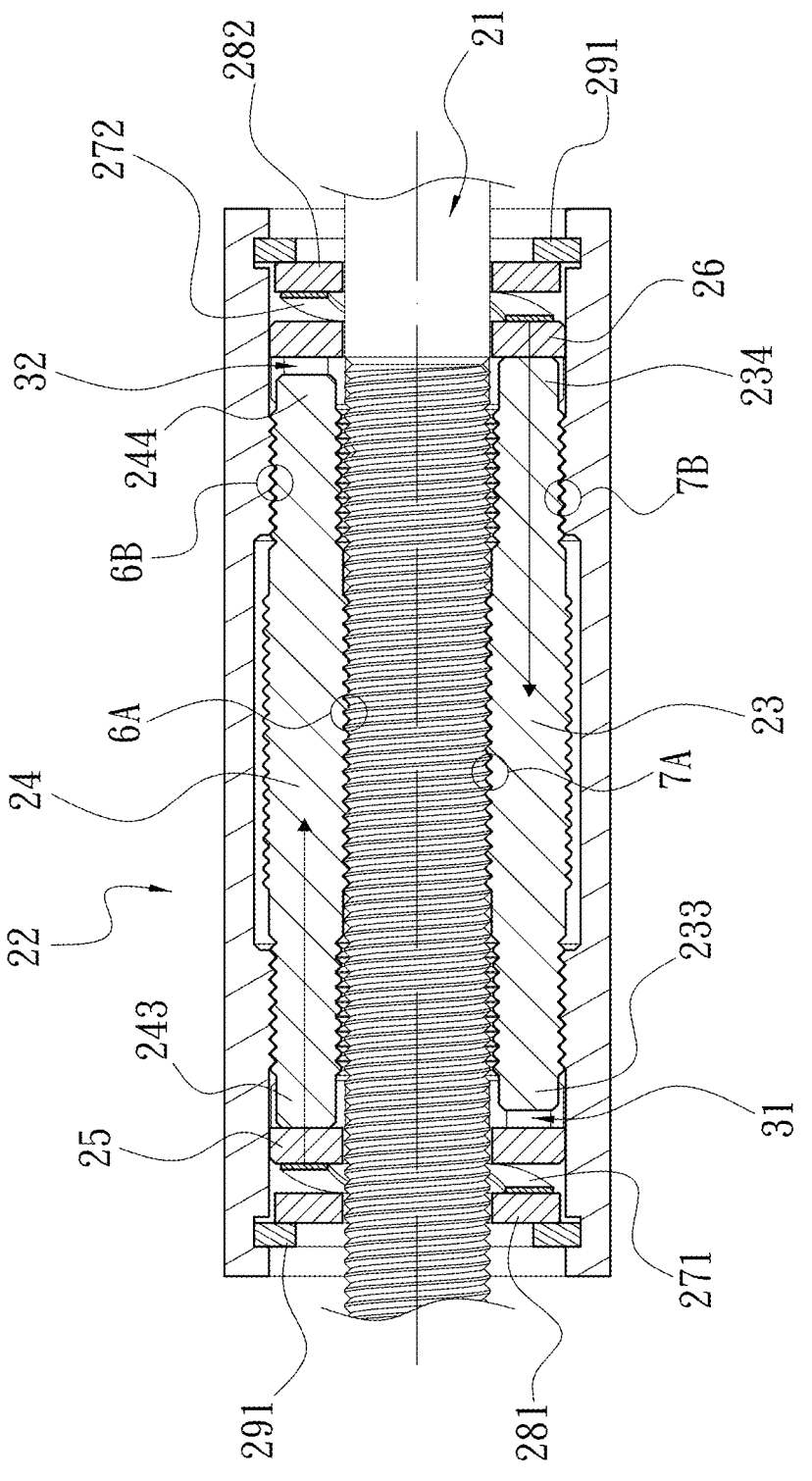
FIG. 5 shows gaps are formed at each end of the roller unit between a retainer and the shorter outermost end sections of one of the first and the second rollers, and the gaps are arranged around the screw in a circumferentially interleaved manner; and two elastic elements apply forces from two opposite directions to create two axially opposed preloads on the first and the second rollers of the roller screw bidirectional axial preloading structure of the present invention.

As shown in FIGS. 4 and 5, the first outermost end sections 233 of the first rollers 23 are movably connected to the first locating slots 251 and respectively have an axial length L1 that is smaller than the slot depth of the first locating slots 251 and also smaller than the axial length L2 of the second outermost end sections 234 of the first rollers 23. That is, since the first outermost end sections 233 of the first rollers 23 respectively have a relatively shorter axial length L1, they can not be fully extended to a bottom of the first locating slots 251, such that a first gap 31 is formed between each first outermost end section 233 and the first retainer 25. On the other hand, the fourth outermost end sections 244 of the second rollers 24 are movably connected to the second locating slots 261 and respectively have an axial length L4 that is smaller than the slot depth of the second locating slots 261 and is also smaller than the axial length L3 of the third outermost end sections 243 of the second rollers 24 that are located at the same side as the fourth outermost end sections 244. In other words, the fourth outermost end sections 244 having a relatively shorter axial length L4 can not be fully extended to a bottom of the second locating slots 261, such that a second gap 32 is formed between each fourth outermost end section 244 and the second retainer 26. The first gaps 31 and the second gaps 32 are formed at two opposite ends of the roller unit R and arranged in a circumferentially interleaved manner, such that the first and the second rollers 23, 24 are subjected to two directionally opposite forces to achieve a bidirectional axial preloading effect.

In an alternative embodiment, both the first rollers 23 and the second rollers 24 have two outermost end sections 233, 234 and 243, 244 of the same axial length, while both the first and the second locating slots 251, 261 of the first and the second retainer 25, 16, respectively, are designed to have different slot depths. This design can still achieve the same effect of preloading the first and the second rollers 23, 24 in a bidirectional, circumferentially interleaved manner. For example, the first locating slots 251 of the first retainer 25 corresponding to the first rollers 23 and the second rollers 24 are different in the slot depths, such that the first outermost end sections 233 of the first rollers 23 are not in contact with the bottom of the relatively deeper first locating slots 251, and a first gap 31 is formed between each first outermost end section 233 and the corresponding deeper first locating slot 251. Similarly, the second locating slots 261 of the second retainer 26 corresponding to the first rollers 23 and the second rollers 24 are different in the slot depths, such that the fourth outermost end sections 244 of the second rollers 24 are not in contact with the bottom of the relatively deeper second locating slots 261, and a second gap 32 is formed between each fourth outermost end section 244 and the corresponding deeper second locating slot 261.

Please refer to FIGS. 2 and 5. The two elastic elements 271, 272 can be, for example, two disk springs, two wave springs, or two spring washers, which are located in the nut 22 to axially elastically press against an axially outer side of the first retainer 25 and the second retainer 26, respectively. A washer 281, 282 and a retaining member 291, 292 (such as a C-ring or an O-ring) are provided at each of two axially outer sides of the elastic elements 271, 272. The retaining members 291, 292 are fitted in the annular recesses 222 correspondingly provided on the inner wall surface of the nut 22 to fixedly hold the elastic elements 271, 272 to predetermined axial positions in the inner bore 220 of the nut 22, preventing the elastic elements 271, 272 from axially sliding out of the nut 22 due to forces applied thereto.

With the above arrangement, the two elastic elements 271, 272 can stably apply an axial positive preload to the first retainer 25 and the second retainer 26 that are located adjacent to the elastic elements 271, 272, respectively. Besides, the design of the circumferentially interleaved first and second gaps 31, 32 is helpful in the selective control of the direction in which the preload is transmitted.

As shown in FIG. 5, the first gaps 31 are formed between the first outermost end sections 233 of the first rollers 23 and the first retainer 25; and the second gaps 32 are formed between the fourth outermost end sections 244 of the second rollers 25 and the second retainer 26.

Figure 6B:
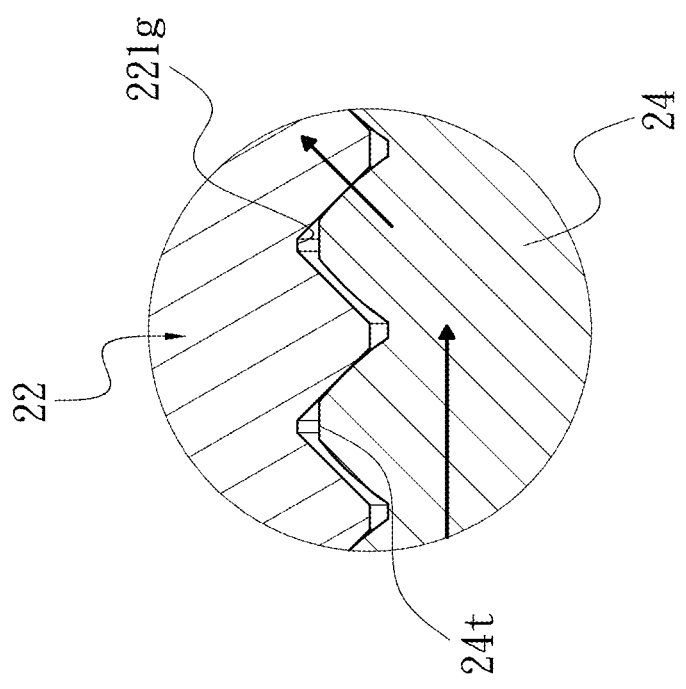
FIGS. 6A and 6B show the second rollers in the preferred embodiment of the present invention are pushed rightward.
Figure 6A:
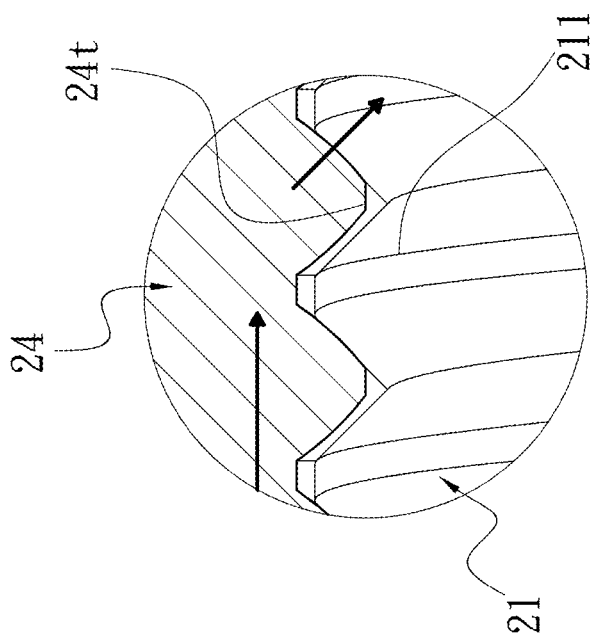

As shown in FIGS. 6A and 6B, the elastic element 271 located at a left side in FIG. 5 applies a preload, which is transmitted via the first retainer 25. However, since there are the first gaps 31 existed between the first rollers 23 and the first retainer 25, the preload is not acted on the first rollers 23. In stead, the preload applied by the elastic element 271 is directly transmitted via the first retainer 25 to the second rollers 24 that are in tight contact with the first retainer 25. Thus, the annular teeth 24t of the second rollers 24 are pushed to contact a left side of the thread structure 211 of the screw 21 and a left side of the annular grooves 221g of the nut 22, such that the second rollers 24 are in stable engagement with the screw 21 and the nut 22.

Figure 7B:
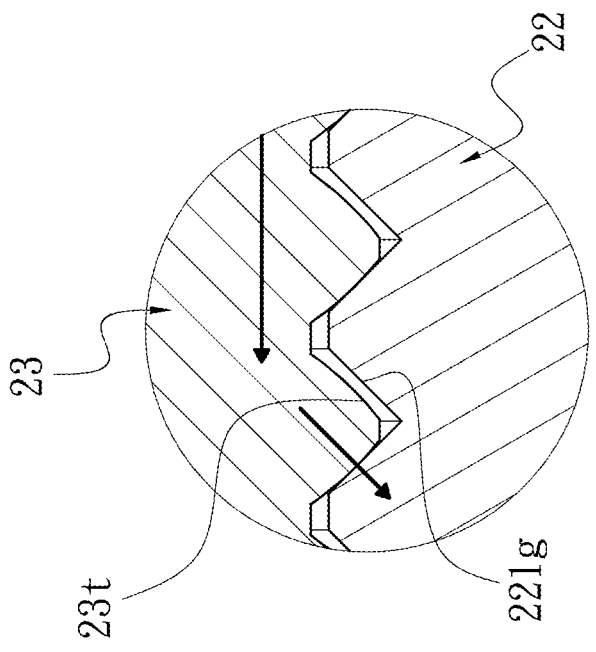
FIGS. 7A and 7B show the first rollers in the preferred embodiment of the present invention are pushed leftward.
Figure 7A:
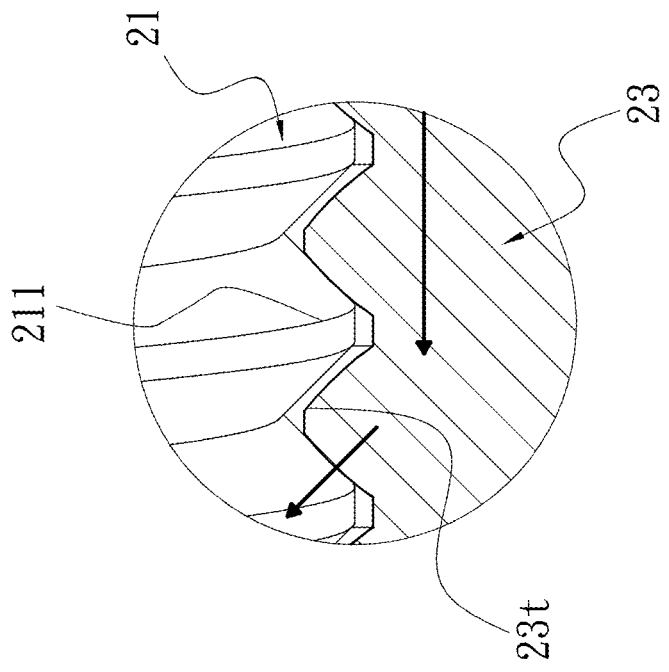

Similarly, as shown in FIGS. 7A and 7B, the elastic element 272 located at a right side in FIG. 5 produces a preload, which is transmitted via the second retainer 26. However, since there are the second gaps 32 existed between the second rollers 24 and the second retainer 26, the preload is not acted on the second rollers 24. In stead, the preload is acted on the first rollers 23 that are in tight contact with the second retainer 26. Thus, the annular teeth 23t of the first rollers 23 are pushed to contact a right side of the thread structure 211 of the screw 21 and a right side of the annular grooves 221g of the nut 22, such that the first rollers 23 are in stable rolling engagement with the screw 21 and the nut 22 to effectively prevent the screw 21 from skidding and idling.

In the present invention, the two elastic elements 271, 272 are arranged at two ends of the nut 22. The circumferentially interleaved first and second gaps 31, 32 accurately set the paths of transmitting the axial preloads, such that the elastic elements 271, 272 can act on only specific second rollers 24 and the first rollers 23, respectively, to apply two directionally opposite positive preloads on the second and the first rollers 24, 23. With this design, it is able to ensure that all the first and second rollers 23, 24 can be in tight rolling contact with corresponding contact areas on the screw 21 and the nut 22 to overcome any gap existed between the roller unit R and the screw 21 as well as between the roller unit R and the nut 22 due to manufacturing tolerance. Therefore, it is able to achieve effectively reduced sliding friction and backlash between the roller unit R and the screw 21 as well as between the roller unit R and the nut 22, upgraded stability of pure rolling and overall transmission accuracy of the rollers, and extended system service life.

Furthermore, in the present invention a bearing such as a ball bearing, roller bearing, or needle bearing may be respectively disposed between the first retainer 25 and the elastic element 271, and between the second retainer 26 and the elastic element 272, so as to form a rotatable contact interface. This arrangement helps reduce contact friction between the elastic elements 271, 272 and the respective first and second retainers 25, 26, thereby minimizing energy loss and nonlinear deviations during the application of preload. As a result, it contributes to maintaining a stable preload effect and improves the consistency and stability of the overall preload response.

In conclusion, the roller screw bidirectional axial preloading structure of the present invention is characterized in that the elastic elements 271, 272 are provided at two ends of the roller unit R, and that both the first and the second rollers 23, 24 include two outermost end sections having different axial lengths, or both the first and the second retainer 25, 26 are provided with locating slots having different slot depths, such that first gaps 31 and second gaps 32 arranged in a circumferentially interleaved manner are formed between the two ends of the roller unit R and the first and second retainers 25, 26, and axial preloads can be selectively guided to act on only specific first or second rollers to set up a circumferentially interleaved, bidirectional, and axial preloading mechanism. With these arrangements, it can not only effectively compensate the gaps formed due to machining tolerance and overcome initially formed backlash, but also ensure stable tracks of motion of the first and the second rollers 23, 24, such that the rollers 23, 24 maintain pure rolling state to effectively suppress sliding friction and idling.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A roller screw bidirectional axial preloading structure, comprising:

a screw having a thread structure formed on an outer surface thereof;

a nut being fitted around the screw and having at least one annular grooved zone provided on an inner wall surface thereof;

a roller unit being provided between the screw and the nut and including a plurality of first rollers and a plurality of second rollers; the first and the second rollers being arranged around the screw in a circumferentially interleaved manner; the first and the second rollers being provided on around respective outer circumferential surfaces with a plurality of annular teeth for meshing with the thread structure on the screw and the at least one annular grooved zone in the nut;

a retainer unit being provided in the nut and including a first retainer and a second retainer, which are located at two ends of the roller unit; each of the first rollers having a first and a second outermost end section connected to the first and the second retainer, and each of the second rollers having a third and a fourth outermost end section connected to the first and the second retainer; a first gap being formed between each first outermost end section of the first rollers and the first retainer, and a second gap being formed between each fourth outermost end section of the second rollers and the second retainer; and the first gaps and the second gaps located at two opposite ends of the roller unit being arranged in a circumferentially interleaved manner; and two elastic elements being fitted in the nut to be separately located at two axially outer sides of the first and the second retainer; a retaining member being provided at an axially outer side of each of the two elastic elements to prevent the elastic elements from axially sliding out of the nut; whereby the two elastic elements can respectively apply an axially positive force on the first and the second rollers to form an interleaved, bidirectional, and axial preloading arrangement.

2. The roller screw bidirectional axial preloading structure as claimed in claim 1, wherein the two elastic elements apply two directionally opposite axial preloads to the first rollers and the second rollers via the second and the first retainer, respectively.

3. The roller screw bidirectional axial preloading structure as claimed in claim 1, wherein the nut is provided on the inner wall surface with two annular recesses, and the two retaining members being separately set in the two annular recesses.

4. The roller screw bidirectional axial preloading structure as claimed in claim 1, wherein the first retainer is provided with a plurality of first locating slots; the first outermost end sections of the first rollers and the third outermost end sections of the second rollers being received in the first locating slots; and all the first locating slots having the same slot depth; and the second retainer being provided with a plurality of second locating slots;

the second outermost end sections of the first rollers and the fourth outermost end sections of the second rollers being received in the second locating slots; and all the second locating slots having the same slot depth; and the first outermost end sections of the first rollers received in the first locating slots having an axial length, which is smaller than an axial length of the second outermost end sections of the first rollers and the slot depth of the first locating slots, such that a first gaps is formed between the first retainer and each of the first outermost end sections; and the fourth outermost end sections of the second rollers received in the second locating slots having an axial length, which is smaller than an axial length of the third outermost end sections of the second rollers and the slot depth of the second slot depth, such that a second gap is formed between the second retainer and each of the fourth outermost end sections; and the first gaps and the second gaps being formed at two ends of the roller unit and arranged in a circumferentially interleaved manner.

5. The roller screw bidirectional axial preloading structure as claimed in claim 1, further comprising a washer provided between each of the elastic elements and the retaining member located at the axially outer side of the elastic element.

* * * * *